United States Patent
Mietke et al.

(10) Patent No.: US 10,452,515 B2
(45) Date of Patent: Oct. 22, 2019

(54) AUTOMATED ROOT CAUSE DETECTION USING DATA FLOW ANALYSIS

(71) Applicant: SAP SE, Walldorf (DE)

(72) Inventors: Sebastian Mietke, Wiesloch (DE); Toni Fabijancic, Eppelheim (DE)

(73) Assignee: SAP SE, Walldorf (DE)

( * ) Notice: Subject to any disclaimer, the term of this patent is extended or adjusted under 35 U.S.C. 154(b) by 136 days.

(21) Appl. No.: 15/615,057

(22) Filed: Jun. 6, 2017

(65) Prior Publication Data

US 2018/0349251 A1    Dec. 6, 2018

(51) Int. Cl.
*G06F 11/00*    (2006.01)
*G06F 11/36*    (2006.01)

(52) U.S. Cl.
CPC ........ *G06F 11/3636* (2013.01); *G06F 11/362* (2013.01); *G06F 11/366* (2013.01)

(58) Field of Classification Search
CPC .. G06F 11/3636; G06F 11/362; G06F 11/366; G06F 11/079; G06F 11/3604; G06F 11/3612; G06F 11/3664; G06F 11/368; G06F 8/70
See application file for complete search history.

(56) References Cited

U.S. PATENT DOCUMENTS

| | | | |
|---|---|---|---|
| 7,810,071 B2 | 10/2010 | Thebes et al. | |
| 7,958,486 B2 | 6/2011 | Tsyganskiy et al. | |
| 7,987,390 B2 | 7/2011 | Chandrasekaran | |
| 2010/0299654 A1 | 11/2010 | Vaswani et al. | |
| 2015/0234730 A1 | 8/2015 | Puthuff et al. | |
| 2016/0019133 A1 | 1/2016 | Forgács | |
| 2016/0062765 A1* | 3/2016 | Ji | G06F 8/75 717/122 |
| 2017/0139819 A1* | 5/2017 | D'Andrea | G06F 11/3688 |
| 2017/0161182 A1* | 6/2017 | Yoshida | G06F 11/3692 |
| 2018/0060150 A1* | 3/2018 | Cunico | G06F 11/079 |
| 2018/0203891 A1 | 7/2018 | Mietke et al. | |

OTHER PUBLICATIONS

"How to run transaction st05 to trace a program, transaction or user execution", Oct. 29, 2015, 7 pages, downloaded from https://wiki.scn.sap.com/wiki/display/SAPSQL/How+to+run+transaction+st05+to+trace+a+program%2C+transaction+or+user+execution.

* cited by examiner

*Primary Examiner* — Joseph D Manoskey
(74) *Attorney, Agent, or Firm* — Sterne, Kessler, Goldstein & Fox P.L.L.C.

(57) ABSTRACT

Disclosed herein are system, method, and computer program product embodiments for error root cause detection. An embodiment operates by a computer implemented method that includes receiving, by at least one processor, a request to determine a root cause of an error associated with a code and executing a first execution path and a second execution path, where the first and second execution paths correspond to the code. The method further includes determining whether a difference between first data generated by the execution of the first execution path and second data generated by the execution of the second execution path affects the error associated with the code. The method also includes identifying a code component that contributed to the difference between the first data and the second data, if the difference between the first data and the second data affects the error associated with the code.

20 Claims, 8 Drawing Sheets

FIG. 3

| Development Object | Version |
|---|---|
| A->METHOD_1 | 1 |
| A->METHOD_1 | 2 |
| B->METHOD_1 | 1 |
| Y->METHOD_1 | 1 |
| Y->METHOD_1 | 2 |
| D->METHOD_1 | 1 |
| D->METHOD_1 | 2 |
| D->METHOD_1 | 3 |
| D->METHOD_2 | 1 |
| D->METHOD_2 | 2 |

FIG. 2

| Step Id | Development Object |
|---|---|
| 1. | A->METHOD_1 |
| 2. | B->METHOD_1 |
| 3. | Y->METHOD_1 |
| 4. | D->METHOD_1 |
| 5. | D->METHOD_2 |

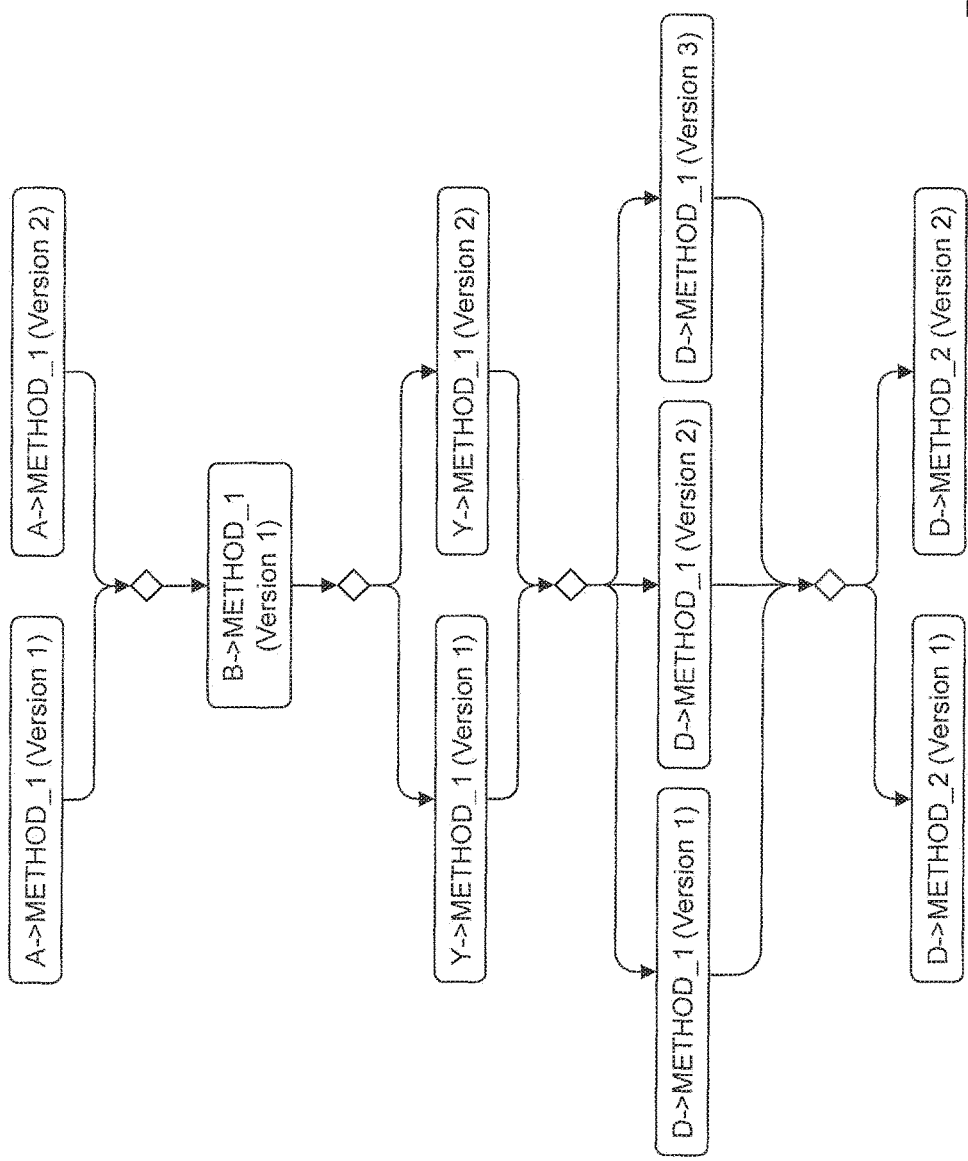

AUTOMATED ROOT CAUSE DETECTION USING DATA FLOW ANALYSIS

BACKGROUND

When software is created and delivered to customers, the software or a modified version of the software (e.g., modified by the customer) may include errors. Not all situations can be tested on the software before it is delivered to the customer. Also, the software can be modified multiple times in the customer's system. Detecting and determining the root cause of errors and issues with the software can be difficult, time consuming, and expensive. Sometimes instead of solving the issue, workarounds are provided to the customers. The workarounds may be able to handle the symptoms to some extent, but the issue remains unsolved, thereby possibly causing problems in the future.

BRIEF DESCRIPTION OF THE DRAWINGS

The accompanying drawings are incorporated herein and form a part of the specification.

FIG. 2 illustrates an exemplary table including example code components, according to some embodiments.

FIG. 3 illustrates an exemplary table including version(s) of example code components, according to some embodiments.

FIG. 4 is an exemplary illustration of different execution paths, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for achieving automated root cause detection.

Figure 1:
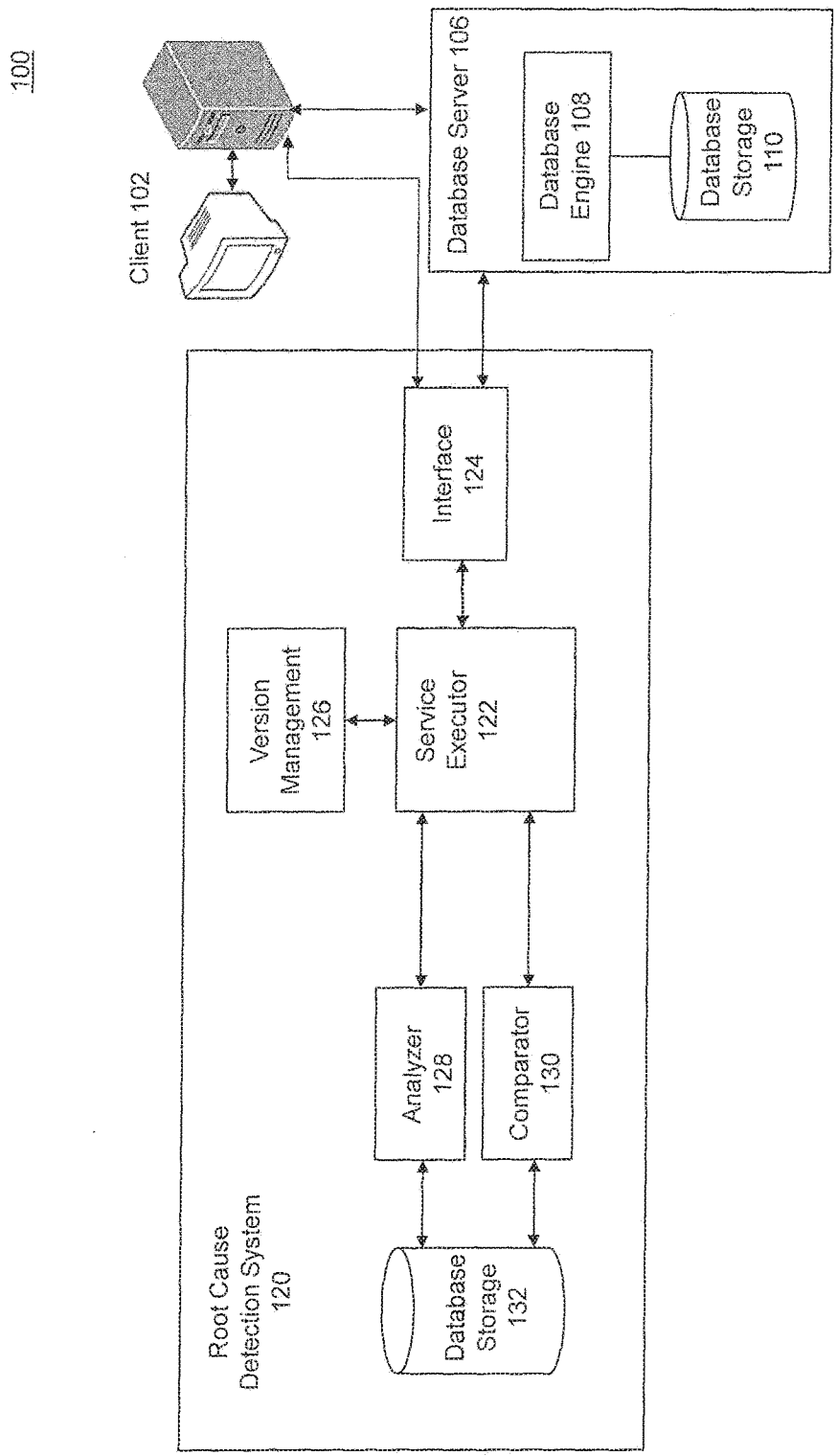
FIG. 1 is an illustration of an exemplary system including a root cause detection system, according to some embodiments.

FIG. 1 is an illustration of an exemplary system including a root cause detection system, according to some embodiments. The system 100 can include a client system 102, a database server 106, and a root cause detection system 120.

The database server 106 can include a database engine 108 and a database storage 110. Client system 102 can be operable to send a request for data, such as in the form of a database query, to database server 106. Client system 102 can communicate with database server 106 over a network (not shown). Database server 106 can reply to the request by sending a set of results, for example, in the form of result rows from a database table, to client system 102 over, for example, the network. One skilled in the relevant arts will appreciate that any data format operable to convey a request for data and a reply to the request may be used. In accordance with an embodiment, the requests and replies can be consistent with the conventions used in the Structured Query Language ("SQL"), although this example is provided solely for purposes of illustration and not limitation.

The network (not shown) can optionally be either a public or private communications network. In accordance with an embodiment, the network can be the Internet. In accordance with an additional embodiment, the network can be a private intranet, such as a corporate network. The network can be any other form of a wired network, a wireless network, or a combination thereof.

When a request for data, such as a query, is received by database server 106, it can be handled by database engine 108, in accordance with an embodiment. Database engine 108 can be operable to determine the data requested by the query, obtain the data, and provide a reply to the query. One skilled in the relevant arts will appreciate that while database engine 108 is illustrated as a single module in system 100, database engine 108 may be implemented in a number of ways in order to accomplish the same function, including separating any of the aforementioned operations performed by database engine 108 into individual modules.

Database engine 108 can be operable to obtain the data in response to the query from database storage 110, in accordance with an embodiment. Database storage 110 can store values of a database in a data structure. In accordance with an embodiment, database values can be stored in a table data structure, the table having data rows and columns. At the intersection of each row and column is a data cell, the data cell having access to a data value corresponding to the associated row and column. Each column, in accordance with an embodiment, has an associated data type, such as "string" or "integer," which can be used by database engine 108, client system 102, and/or root cause detection system 120 to interpret data contained in a data cell corresponding to the column. In accordance with an embodiment, the database storage 110 can comprise multiple tables. In an embodiment, database engine 108 can further include an aggregator (not shown) and an optimizer (not shown).

Additionally, database storage 110 can comprise alternate means of indexing data (e.g., bitmap) stored in a table of a database, in accordance with an embodiment. Database engine 108 can be operable to analyze a query to determine whether an available alternate means is useful to access the data stored in a table. Depending on the result of the analysis, the database engine 108 may utilize this alternate means to obtain data from the table, in accordance with an embodiment.

According to one embodiment, the optimizer (not shown) can be configured to reorder and/or reorganize the rows of data of a table data structure of a database to, for example, optimize the memory size and/or performance. In one example, the optimizer can reorder a table data structure of the database to build blocks of data to store the information with block-description. In this example, the blocks can correspond with a major query type.

According to some embodiments, root cause detection system 120 can be configured to provide automated methods to detect one or more root causes of errors that may have occurred during the execution of a software (e.g., computer program such as instructions executing on a processing device such as, but not limited to, a source code—herein referred to as code) executed by, for example, client system 102. In some examples, the code is executed on client system 102. During and/or after the execution of the code, client system 102 (or a user of client system 102) may detect that one or more errors, flaws, failures, or faults (collectively referred herein as error) have occurred that have, for example, produced an incorrect or unexpected result, or have caused a system to behave in unintended ways. The one or more errors can occur with respect to, for example, a value of a variable, a value of a data structure, the structure of the data structure, the operation of a function, the operation of a method, etc.

According to some embodiments, upon occurrence or detection of the errors, client system 102 can directly or indirectly trigger operations of root cause detection system 120 to determine the one or more root causes of the errors. For example, upon occurrence or detection of the errors, client system 102 can send a request to root cause detection system 120 (e.g., report an incident to root cause detection system 120). According to some embodiments, with the request to root cause detection system 120 or after the request, client system 102 can send information associated with the code or the errors to root cause detection system 120 for further analysis. Additionally or alternatively, client system 102 can send the information associated with the code or the errors to database server 106 to be stored at, for example, database storage 110. In this example, root cause detection system 120 can retrieve the information associated with the code or the errors from database server 106.

According to some embodiments, the information associated with the code or the errors can include the errors and/or symptoms of the errors. Additionally or alternatively, the information associated with the code or the errors can include information regarding one or more parameters, one or more variables, one or more fields, one or more data structures, etc., that have incorrect or unexpected results. The information associated with the code or the errors can also include the expected result for the one or more parameters, the one or more variables, the one or more fields, the one or more data structures, etc. Additionally or alternatively, the information associated with the code or the errors can include the time when the errors first occurred and/or when the errors last occurred. Additionally or alternatively, the information associated with the code or the errors can include a detailed description on how to reproduce the errors or steps performed that resulted in the errors. The information associated with the code or the errors can also include any changes made to the code by, for example, client system 102 or users of client system 102 before or after the execution of the code produced the errors.

According to some embodiments, root cause detection system 120 can include an optional interface 124 such that a service executor 122 can be communicatively coupled to, for example, client system 102 and/or database server 106. Service executor 122 may be configured to receive a request for root cause detection from, for example, client system 102, and receive or retrieve the information associated with the code or the errors. Service executor 122 may be configured to execute the code with one or more versions of code components (for example using version management 126). Service executor 122 may be further configured to determine (in cooperation with, for example, analyzer 128 and comparator 130) one or more code components that may have contributed to the code errors. The code components that may have contributed to the code errors or analysis done by service executor 122, analyzer 128, and comparator 130 can be stored in, for example, database storage 132 as, for example, an analysis log. This log can be used for further analysis.

One skilled in the relevant arts will appreciate that while root cause detection system 120 is illustrated as a combination of service executor 122, interface 124, version management 126, analyzer 128, comparator 130, and database storage 132, root cause detection system 120 may be implemented in a number of ways in order to accomplish the same function, including separating each of the operations performed by root cause detection system 120 into individual modules. Additionally or alternatively, root cause detection system 120 may be implemented by combining operations of one or more of service executor 122, interface 124, version management 126, analyzer 128, comparator 130, and database storage 132. Accordingly, the illustration of components in root cause detection system 120 is not a limitation on the implementation of root cause detection system 120.

According to some embodiments, root cause detection system 120 is configured to perform a data flow analysis process. The data flow analysis process can include executing the code and reproducing the errors reported by, for example, client system 102 while tracking the relevant code components. Service executor 122 may receive a request to determine the root causes of errors associated with the code. For example, service executor 122 may receive the request from client system 102. The request can be associated with a code that was executed by client system 102 that generated the errors. Service executor 122 can also receive or retrieve information associated with the code or the errors. For example, client system 102 can send the information associated with the code or the errors to service executor 122 with or after sending the request. Additionally or alternatively, service executor 122 can retrieve the information associated with the code or the errors from, for example, database server 106.

Service executor 122 may be further configured to execute the same code (in some examples, using different versions of code components as discussed in detail below) as the code for which service executor 122 received the request for root cause detection. According to some embodiments, service executor 122 is configured to execute the code based on the received information associated with the code and/or the errors. For example, the information associated with the code or the errors include information describing a step by step description of how the code was executed by client system 102. During execution of the code, service executor 122 may be configured to track the call stack (e.g., execution stack, control stack, program stack, machine stack, run-time stack, etc.) associated with the code. (It is noted that functionality described herein as performed by service executor 122 may alternatively be performed by service executor 122 in combination with analyzer 128.)

Additionally or alternatively, service executor 122 may be configured to track code components associated with the code. Also, service executor 122 can be configured to track other execution steps (such as, but not limited to, parameters, variables, functions, methods, classes, database statements, etc) associated with the same or substantially the same code.

Service executor 122 may be further configured to store the tracked information or any analysis associated with the code or the errors in an analysis log in, for example, database storage 132. The results of the data flow analysis process (e.g., the tracked information and/or any analysis stored in the analysis log) can be used for a path execution service, as discussed below.

In addition to the data flow analysis process, root cause detection system 120 can be configured to perform a path execution service. The path execution service allows the execution of different execution paths using different versions of code components, and allows the comparison between the different execution paths, to determine the root causes of errors. According to some embodiments, the automated data flow analysis process and path execution service are configured to determine root causes of errors, and therefore, the code components that possibly contribute to the errors can be more efficiently identified. These processes can save more time and financial resources.

According to some embodiments, service executor 122 can access or retrieve the analysis log from, for example, database storage 132, for the path execution service. In some examples, the analysis log can include code components (and/or information associated with the code components) corresponding to the erroneous code. Erroneous code can be the code that was executed by, for example, the client system 102 that generated the errors. For example, when the same code (in some examples, using different versions of code components as discussed in detail below) as the erroneous code is executed during the data flow analysis process, the code components (or information associated with the code components) corresponding to the erroneous code are tracked and stored in the analysis log. Service executor 122, analyzer 128, and comparator 130, may use the code components (or information associated with the code components) corresponding to the erroneous code to perform the path execution service.

According to some embodiments, service executor 122 uses version management 126 to determine different versions for each of the code components corresponding to the erroneous code. Version management 126 can be configured to store or track different versions of different code components. Each code component can have one or more versions. Versions of code components can include the latest version of each code component, older versions of each code component, a working version of each code component, one or more versions of each code component used for different systems, different customers, etc., one or more versions of each code component developed during the development of the code, the versions of each code component of the erroneous code, etc. According to some embodiments, when the information associated with the code or the errors provided to service executor 122 includes the time when the errors first occurred or when the errors last occurred, service executor 122 or version management 126 may filter the versions for the code components based on the provided time/time frame. Therefore, service executor 122 or version management 126, may reduce the number of different versions that need to be analyzed. For example, service executor 122 or version management 126 may filter out "old" versions based on the provided time/time frame.

As a non-limiting example, FIG. 2 illustrates an exemplary table that includes code components. According to some examples, table 200 can be part of the analysis log stored in, for example, database storage 132. Table 200 can be generated by service executor 122 during execution and tracking of the same code as the erroneous code (e.g., during data flow analysis process.) Table 200 can include code components (or information associated with the code components) corresponding to the erroneous code. For example, table 200 includes a column 202 for the code components (e.g., development objects). In this example, the erroneous code includes the following code components: A→METHOD_1, B→METHOD_1, Y→METHOD_1; D→METHOD_1; and D→MFTHOD_2. In this non-limiting example, A, B, Y, and D are class names that can have different methods (e.g., METHOD 1, METHOD 2.) Table 200 also includes column 204 that describes the order in which the code components appear in the erroneous code. In this example, the code component's appearance in the erroneous code is A→METHOD_1; B→METHOD_1, Y→METHOD_1; D→METHOD_1; and D→METHOD_2. In other words, code component A→METHOD_1 can be executed first. The execution of A→METHOD_1 can call code component B→METHOD_1. Then, the execution of B→MFTHOD_1 can call code component Y→METHOD_1, and so on. It is noted that this is a non-limiting example, and other code components and other execution orders can be used.

As another non-limiting example, FIG. 3 illustrates an exemplary table including versions of code components. Table 300 can be stored and tracked by version management 126. Table 300 can include versions of code components (or information associated with versions of the code components). For example, table 300 includes a column 302 for the code components (e.g., development objects). In this example, table 300 includes the following code components: A→METHOD_1, B→METHOD_1, Y→METHOD_1; D→METHOD_1; and D→METHOD_2. Table 300 also includes a column 304 for the versions of the code components. For example, code component A→METHOD_1 has versions 1 and 2, code component B→METHOD_1 has version 1, code component Y→METHOD_1 has versions 1 and 2, code component D→METHOD_1 has versions 1, 2, and 3, and code component D→METHOD_2 has versions 1 and 2. It is noted that this is a non-limiting example, and other code components and other versions can be used.

According to some embodiments, version management 126 can store or track "where used" data. "Where used" data can include information about where code components or versions of code components are called in the code. Additionally or alternatively, version management 126 (or other components of root cause detection system 120) can receive the "where used" data from client system 102. Version management 126 (or other components of root cause detection system 120) can retrieve the "where used" data from the analysis log.

Using the information from the analysis log or from version management 126, service executor 122 may be configured to determine (e.g., plan) one or more execution paths. Service executor 122 is further configured to execute the execution paths. Service executor 122, analyzer 128, and comparator 130 may be configured to analyze data and information associated with the executed execution paths to determine root causes for the errors of the erroneous code.

According to some embodiments, service executor 122 identifies (or determines) code components corresponding to the erroneous code using the analysis log, as well as their order of execution, and determines one or more versions for each of the code components using the information received or retrieved from version management 126. Using at least this information, service executor 122 determines the execution paths.

According to some embodiments, the execution paths can include possible combinations of the different versions of code components while following the same order of execution of the code components for each of these combinations. For example, a first execution path can include a first version of the first code component, a first version of the second code component (the second code component being called by the first code component), a first version of the third code component (the third code component being called by the second code component), etc., and a first version of the $n^{th}$ code component (n being an integer equal to or greater than 1). In this example, a second execution path can include a first version of the first code component, a first version of the second code component, a first version of the third code component, etc., and a second version the $n^{th}$ code component. The other execution paths can be planned in a similar manner.

FIG. 4 is an exemplary illustration of different possible execution paths 400 determined by service executor 122. In one example, a first execution path can include the following code components and their versions: A→METHOD_1 (Version 1); B→METHOD_1 (Version 1); Y→METHOD_1 (Version 1); D→METHOD_1 (Version 1); and D→METHOD_2 (Version 1). In this example, a second execution path can include the following code components and their versions: A→METHOD_1 (Version 1); B→METHOD_1 (Version 1); Y→METHOD_1 (Version 1); D→METHOD_1 (Version 2); and D→METHOD_2 (Version 1). In this example, a third execution path can include the following code components and their versions: A→METHOD_1 (Version 2); B→METHOD_1 (Version 1); Y→METHOD_1 (Version 2); D→METHOD_1 (Version 2); and D→METHOD_2 (Version 1). Other execution paths can be similarly determined.

After determining the execution paths, service executor 122 may be configured to execute each of the execution paths. According to some embodiments, service executor 122 is configured to simultaneously or substantially simultaneously execute the execution paths. Such execution of the execution paths can be done, for example, using multiple threads. Additionally or alternatively, service executor 122 can execute one execution path after another (e.g., sequentially). However, it is noted that service executor 122 can be configured to execute the execution paths in any order.

According to some embodiments, service executor 122 is configured to determine the results of each execution path. Comparator 130, alone or in combination with analyzer 128, compares the results of the execution paths to determine and identify one or more code components that may potentially contribute to the errors of the erroneous code. In some examples, comparator 130 performs this analysis during the parallel execution of the execution paths. Additionally or alternatively, service executor 122 may store the results of each execution path in, for example, database storage 132, and comparator 130 may access database storage 132 to perform the analysis.

According to some embodiments, comparator 130 may compare the overall results at the end of each execution path between different execution paths. If comparator 130 detects mismatches or differences between the overall results at the end of each execution path between different execution paths, comparator 130 may perform a more detailed comparison between, for example, the execution paths with the mismatches/differences. In other words, comparator 130 may determine the execution paths that contributed to the mismatches/differences, and then may perform the detailed comparison and analysis. During the detailed comparison, comparator 130 may compare results of each part of the execution path (e.g., results of each code component of the execution path) between different execution paths. In some examples, the granularity of the detailed comparison can be adjusted automatically, or manually by a user (e.g., an analyzer) of root cause detection system 120.

In some embodiments, when comparator 130 identifies code components that possibly contribute to the erroneous code, the comparator 130 (alone or in combination with analyzer 128) can discontinue execution and analysis of the execution paths.

According to some embodiments, the results of each execution path, or the results of each part of each execution path (e.g., each code component), can include input parameters, export parameters, runtime parameters, table contents, column contents, associations between data and database entities, variables, parameters, data structures, functions, methods, classes, etc. Comparator 130 may be configured to compare the results of each execution path, or the results of each version of each code component of the execution paths. In other words, comparator 130 can compare the results of each execution path, or the results of each step of each execution path.

According to some embodiments, instead of executing some of the execution paths, the results (or part of the results) of some of the execution paths can be manually entered by, for example, a user of root cause detection system 120. These manually entered results (or part of the results) may also be compared with each other, as well as results of other execution paths.

According to some embodiments a mismatch or difference between the result of the execution paths can trigger analyzer 128 to conclude that the code component in which the mismatch or difference occurred can be a possible source of the errors in the erroneous code.

Figure 5:
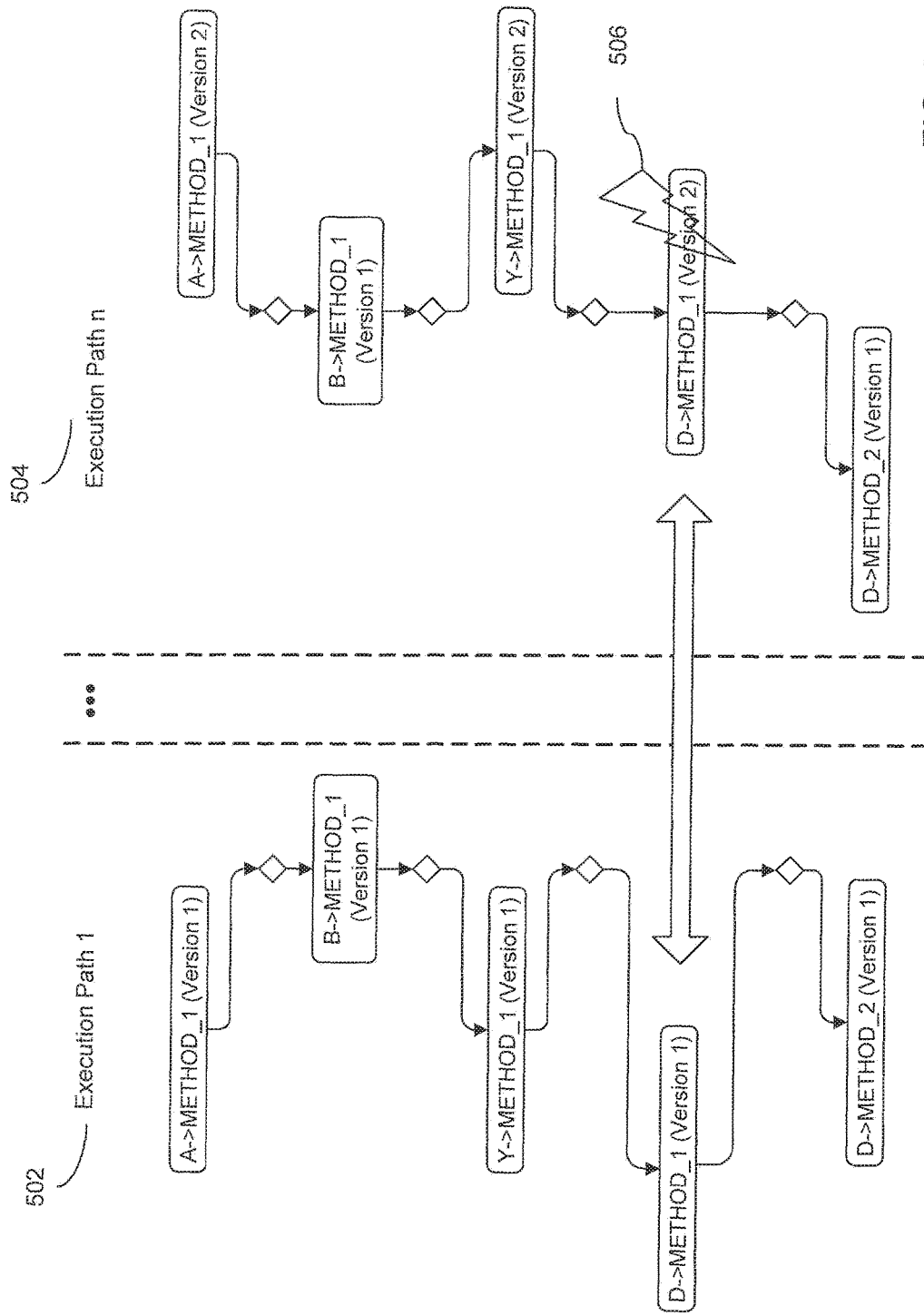
FIG. 5 is an exemplary illustration of two execution paths and a detected error, according to some embodiments.

FIG. 5 is an exemplary illustration of two execution paths and a detected error. In this non-limiting example, two execution paths are illustrated—the first execution path 502 and the $n^{th}$ execution path 504. In this example, the first execution path 502 includes the following code components and their versions: A→METHOD_1 (Version 1); B→METHOD_1 (Version 1); Y→METHOD_1 (Version 1); D→METHOD_1 (Version 1); and D→METHOD_2 (Version 1). In this example, the $n^{th}$ execution path 504 includes the following code components and their versions: A→METHOD_1 (Version 2); B→METHOD_1 (Version 1); Y→METHOD_1 (Version 2); D→METHOD_1 (Version 2); and D→METHOD_2 (Version 1).

After executing the execution paths and analyzing the results, a mismatch 506 is detected between the results of version 1 and version 2 of code component D→METHOD_1. In this example, by determining mismatch 506, root cause detection system 120 can determine that an error may exist in the code component D→METHOD_1. Accordingly, further analysis can be done on this code component (for example, on different versions of this code component.) According to some embodiments, the further analysis can be performed automatically by, for example, root cause detection system 120. Additionally or alternatively, the further analysis can be performed manually by a user of root cause detection system 120.

According to some embodiments, when code components are identified as possible sources of errors, root cause detection system 120 can be configured to further analyze these components. Additionally or alternatively, when code components are identified as possible sources of errors, root cause detection system 120 can generate a report and alert a user of root cause detection system 120. The user of root cause detection system 120 can use the generated report to further analyze these code components. In other words, the further analysis of these components can be performed automatically and/or manually.

As discussed above, comparator 130 may be configured to compare the results of each execution path to determine whether any mismatch or difference exists between the results of the execution paths. According to some embodiments, analyzer 128, alone or in combination with comparator 130, may be further configured to determine whether the detected mismatch or difference may have any effect on the errors of the erroneous code that were sent to root cause detection system 120. Additionally or alternatively, analyzer 128 may be configured to determine whether the detected difference may have any effect on the results of the processes or the results of code components that follow. If analyzer 128 determines that the detected difference has no effect on the errors of the erroneous code that were sent to root cause detection system 120 (or has no effect on the results of the processes or the results of code components that follow), analyzer 128 can ignore the detected difference or indicate that it does not affect the errors. In other words, the code component responsible for the detected difference can be further analyzed to correct any errors it might have, but with the indication that this code component does not affect the errors of the erroneous code that were sent to root cause detection system 120.

As a non-limiting example, if a field in two versions of a code component is different, but that field does not affect the processes after the code component, or does not affect a field with the error that was sent to root cause detection system 120, that field in the code component can be ignored. Continuing with this non-limiting example, the error reported by client system 102 can indicate that date fields associated with the executed erroneous code are wrong. If analyzer 128 determines that a name field in two versions of a code component are different, and the name field does not affect the date field, analyzer 128 can ignore this difference as a potential error that contributes to the reported error. However, analyzer 128 can flag this error for further analysis with an indication that it does not contribute to the reported error.

According to some embodiments, to determine whether the detected difference has no effect on the errors of the erroneous code (or has no effect on the results of the processes or the results of code components that follow), analyzer 128 may be configured to compare the results (or information associated to the results) that produced the difference to the errors (or information associated to the errors). Additionally or alternatively, to determine whether the detected difference has no effect on the errors of the erroneous code (or has no effect on the results of the processes or the results of code components that follow), analyzer 128 can be configured to access information on how results of each code component affects code components that follow. Such information can be stored by, for example, version management 126. For example, analyzer 128, alone or in combination with comparator 130, may analyze the source code of different versions to determine the influence of the detected difference.

As a non-limiting example, analyzer 128 may determine whether a field in a code component, which has been a source of the detected difference, is used later on in the code components that follow. In this example, analyzer 128 may ignore the field if analyzer 128 determines that the field is not used later on in the code components that follows (or if the field's use does not affect the errors of the erroneous code). In this example, if the field, which has been a source of the detected difference, is used later on in the code components that follow, or is used in different execution paths, analyzer 128 may determine that the field can have potential effect on the errors of the erroneous code (or can have potential effect on the results of the processes or the results of code components that follow).

According to some embodiments, the operations of root cause detection system 120 can be performed in one or more secure environments such that there is no impact on any productive system. For example, when operations of root cause detection system 120 uses data or code on a productive system, the data or code may be transferred to a secure environment. Accordingly, the code or data can be modified and tested locally and securely within the secure environment of the productive system, without impacting the productive system. Additionally or alternatively, the operations of root cause detection system 120 can be performed in a testing environment. As used in some embodiments herein, a productive system (or production system) refers to a running computer processing system of an operational business or industrial entity. The entity that uses the system may have expectations that the system, as well as the corresponding data, will be readily and continuously available in order to allow for a smooth and undisturbed operation of the business or industrial entity. A productive environment is a term used by developers to describe the setting within the productive system in which software and other products are actually put into operation for their intended uses by end users. The productive environment can be thought of as a real-time setting where programs are run and hardware setups are installed and relied on for organization or commercial daily operations. In contrast, a testing environment (of a testing system) typically includes a product that is still being used and operated on theoretically. In the testing environment, the users (for example, engineers) often look for bugs or design flaws. This environment differs from a productive environment in which the product has been delivered and needs to work with little or no errors. The secure environment may be generated or otherwise established inside the productive system such that it is separate from the productive environment, for example, logically and/or physically separated. Non-limiting examples of operation within a productive system are described in U.S. patent application Ser. No. 15/407,645, entitled "Data Repair Within Productive System."

Figure 6:
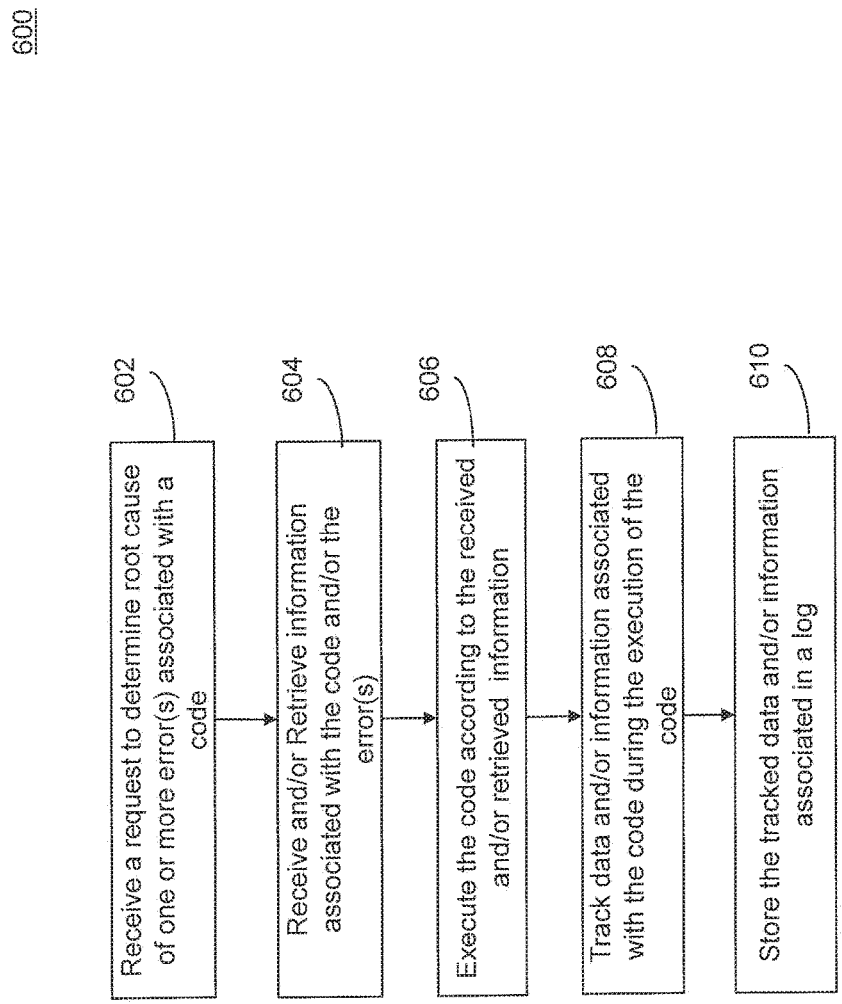
FIG. 6 is a flowchart for a method describing exemplary operations associated with data flow analysis process of a root cause detection system, according to some embodiments.

FIG. 6 is a flowchart for a method 600 describing exemplary operations associated with data flow analysis process of a root cause detection system, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by persons skilled in the relevant art(s).

Method 600 shall be described with reference to FIG. 1. However, method 600 is not limited to this example embodiment.

In 602, service executor 122 receives a request to determine root cause of one or more errors associated with a code. For example, service executor 122 receives the request from client system 102. The request can be associated with the code that was executed by client system 102 that generated the errors (e.g., the erroneous code.)

In 604, service executor 122 can receive or retrieve information associated with the code or the errors. For example, client system 102 can send the information associated with the code or the errors to service executor 122 with or after sending the request to determine the root cause of the errors. Additionally or alternatively, service executor 122 can retrieve the information associated with the code or the errors from, for example, database server 106.

In 606, service executor 122 executes the same code as the code for which service executor 122 received the request for root cause detection. According to some embodiments, service executor 122 is configured to execute the same code based on the received or retrieved information associated with the code or the errors.

In 608 and during execution of the same code, service executor 122 is configured to track data or information associated with the same code. This data or information can include, for example, parameters, variables, data structures, functions, methods, classes, tables, columns, associations between data and database entities, call stack, code components associated with the same code, other execution steps (such as, but not limited to, database statements, etc.), etc., or any combination thereof.

In 610, service executor 122 stores the tracked information or any analysis associated with the code or the errors in an analysis log in, for example, database storage 132.

Figure 7:
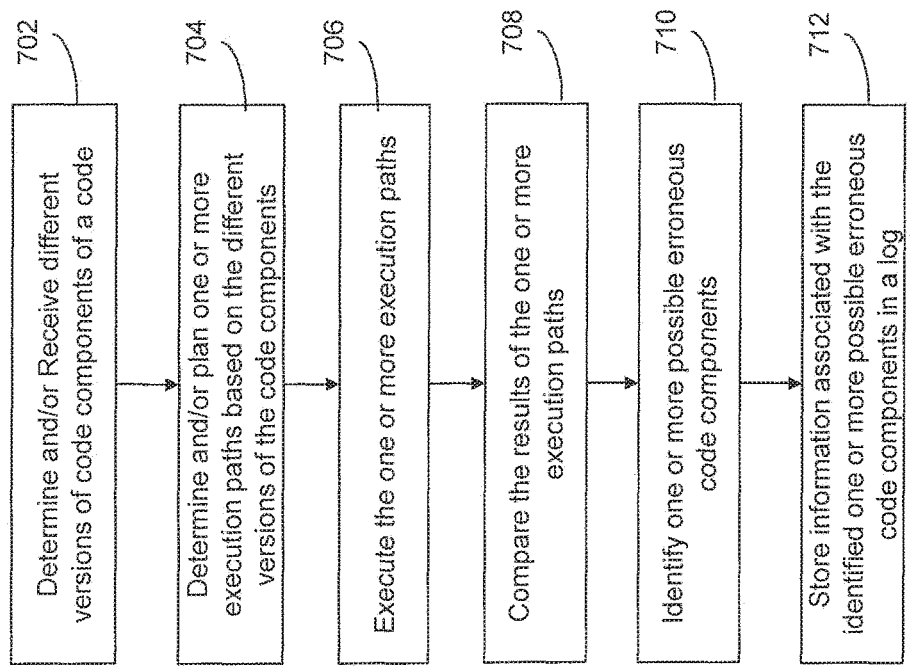
FIG. 7 is a flowchart for a method describing exemplary operations associated with path execution service of a root cause detection system, according to some embodiments.

FIG. 7 is a flowchart for a method 700 describing exemplary operations associated with path execution service of a root cause detection system, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by persons skilled in the relevant art(s).

Method 700 shall be described with reference to FIG. 1. However, method 700 is not limited to this example embodiment.

According to some embodiments, method 700 can be performed after method 600. In other words, after performance of the data flow analysis process discussed above with respect to, for example, method 600, root cause detection system 120 can be configured to perform the path execution service shown in FIG. 7. The path execution service allows the execution of different execution paths using different versions of code components, and allows the comparison between the different execution paths to determine root causes of errors. However, it is noted that method 700 can be performed separately from method 600 and/or the order of methods 600 and 700 can be different, as will be understood by persons skilled in the relevant art(s).

In 702, service executor 122 uses version management 126 to determine or receive different versions for each of the code components (or information associated with the code components) corresponding to the erroneous code. The erroneous code can be the code that was executed by client system 102 that generated the errors.

Although not shown in FIG. 7, before 702, service executor 122 can receive a request to determine the root causes of the errors associated with the code. Service executor 122 can also receive or retrieve information associated with the code or the errors. Additionally or alternatively, before 702, service executor 122 can access the analysis log from, for example, database storage 132 (as discussed in 610 of method 600 of the path execution service). Service executor 122, analyzer 128, and comparator 130 may use the code components (or information associated with the code components) corresponding to the erroneous code for the path execution service.

In 704, service executor 122 may determine (e.g., plan) one or more execution paths. According to some embodiments, service executor 122 may determine the execution paths based on the information from the analysis log or from version management 126.

In 706, service executor 122 may execute the execution paths. Service executor 122 may be configured to determine the results of each execution path.

In 708, comparator 130, alone or in combination with analyzer 125, may compare the results of the execution paths. According to some embodiments, the results of each execution path can include data or information associated with code components of the execution paths, runtime parameters, table contents, column contents, associations between data and database entities, variables, data structures, functions, methods, classes, etc. Comparator 130 may be configured to compare the results of each execution path and/or each version of each code component of the execution paths.

According to some embodiments, in 708, comparator 130 may compare the overall results at the end of each execution path between different execution paths. If comparator 130 detects mismatches or differences between the overall results at the end of each execution path between different execution paths, comparator 130 may determine the execution paths that contributed to the differences. Comparator 130 may further perform a detailed comparison and analysis between, for example, the determined execution paths. During the detailed comparison, comparator 130 may compare results of each part of the execution path (e.g., results of each code component of the execution path) between the determined execution paths.

In 710, analyzer 128 determines and identifies code components that potentially contributed to the errors of the erroneous code.

In 712, analyzer 128 stores information associated with the identified code components that potentially contributed to the errors of the erroneous code in a log in, for example, database storage 132. Additionally or alternatively, when code components are identified as possible sources of errors, analyzer 128 can be configured to further analyze these components. In addition or alternatively, when code components are identified as possible sources of errors, analyzer 128 can generate a report and alert a user of root cause detection system 120. The user can use the generated report to further analyze these code components. In other words, such further analysis of these components can be performed automatically and/or manually.

Method 700 or parts of method 700 can be repeated for each execution path and/or each detected difference between results of the execution of the execution paths. Additionally or alternatively, method 700 or parts of method 700 can be performed simultaneously or substantially simultaneously for each execution path or each detected difference between results of the execution of the execution paths.

Figure 8:
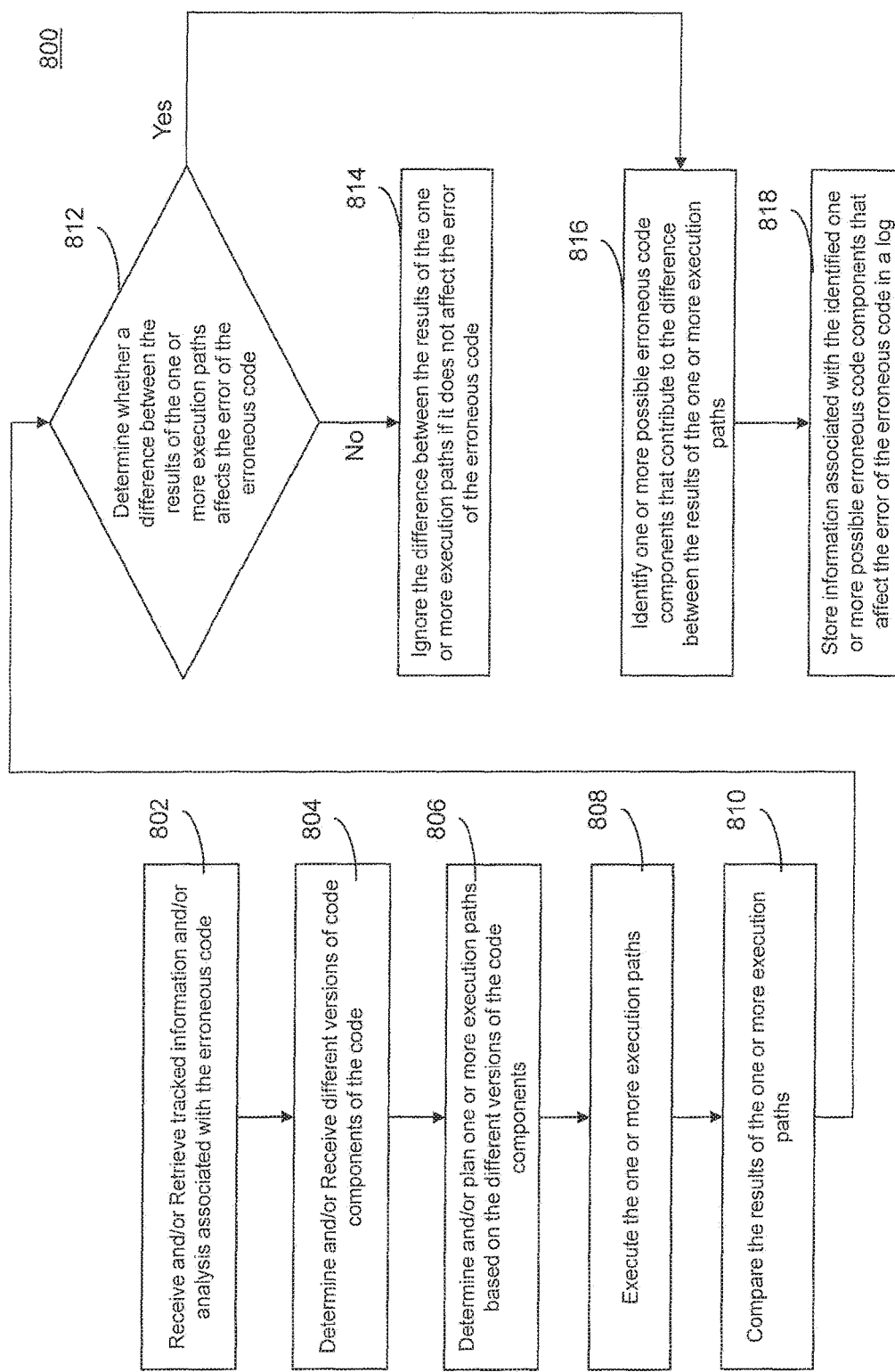
FIG. 8 is a flowchart for another method describing exemplary operations associated with path execution service of a root cause detection system, according to some embodiments.

FIG. 8 is a flowchart for a method 800 describing exemplary operations associated with path execution service of a root cause detection system, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by persons skilled in the relevant art(s).

Method 800 shall be described with reference to FIG. 1. However, method 800 is not limited to this example embodiment. It is noted that, in some embodiments, 804-810 of method 800 are similar to 702-708 of method 700.

In 802, service executor 122 receives or retrieves the tracked information or any analysis associated with the erroneous code or the errors in an analysis log from, for example, database storage 132. The erroneous code can be the code that was executed by client system 102 that generated the errors.

In 804, service executor 122 uses version management 126 to determine or receive different versions for each of the code components (or information associated with the code components) corresponding to the erroneous code.

In 806, service executor 122 may determine (e.g., plan) one or more execution paths.

In 808, service executor 122 may execute the execution paths. Service executor 122 is configured to determine the results of each execution path.

In 810, comparator 130 may compare the results of the execution paths to determine any differences between the results.

In 812, analyzer 128, alone or in combination with comparator 130, may determine whether the detected difference between results of the execution paths has any effect on the errors of the erroneous code that were sent to root cause detection system 120. If analyzer 128 determines that the detected difference between results of the execution paths has no effect on the errors of the erroneous code that were sent to root cause detection system 120, then in 814, analyzer 128 can ignore the detected differences, or indicate that it does not affect the errors. Additionally or alternatively, in 814, analyzer 128 can determine and identify code components that potentially contributed to the errors of the erroneous code. These code components can be further analyzed to correct any errors they may have caused. Or, it can be indicated in the analysis that these code components do not affect the errors of the erroneous code that were sent to root cause detection system 120.

If analyzer 128 in step 812 determines that the detected difference between results of the execution paths has possible effects on the errors of the erroneous code that were sent to root cause detection system 120, then in 816, analyzer 128 may determine and identify one or more code components that may have contributed to the errors of the erroneous code.

In 818, analyzer 128 may store information associated with the identified code components in a log in, for example, database storage 132. Additionally or alternatively, when code components are identified as possible sources of errors, analyzer 128 may further analyze these components. In addition or alternatively, when code components are identified as possible sources of errors, analyzer 128 can generate a report and alert a user of the root cause detection system 120. The user can use the generated report to further analyze these code components. In other words, such further analysis of these components can be performed automatically and/or manually.

Method 800 or parts of method 800 can be repeated for each execution path and/or each detected difference between results of the execution of the execution paths. For example, 810-818 can be performed for a first detected difference between results of the execution paths that has no effect on the errors of the erroneous code that were sent to root cause detection system 120. Further, 810-818 can be repeated for a second detected difference between results of the execution paths that has possible effects on the errors of the erroneous code that were sent to root cause detection system 120. Additionally or alternatively, method 800 or parts of method 800 can be performed simultaneously or substantially simultaneously for each execution path and/or each detected difference between results of the execution of the execution paths.

Figure 9:
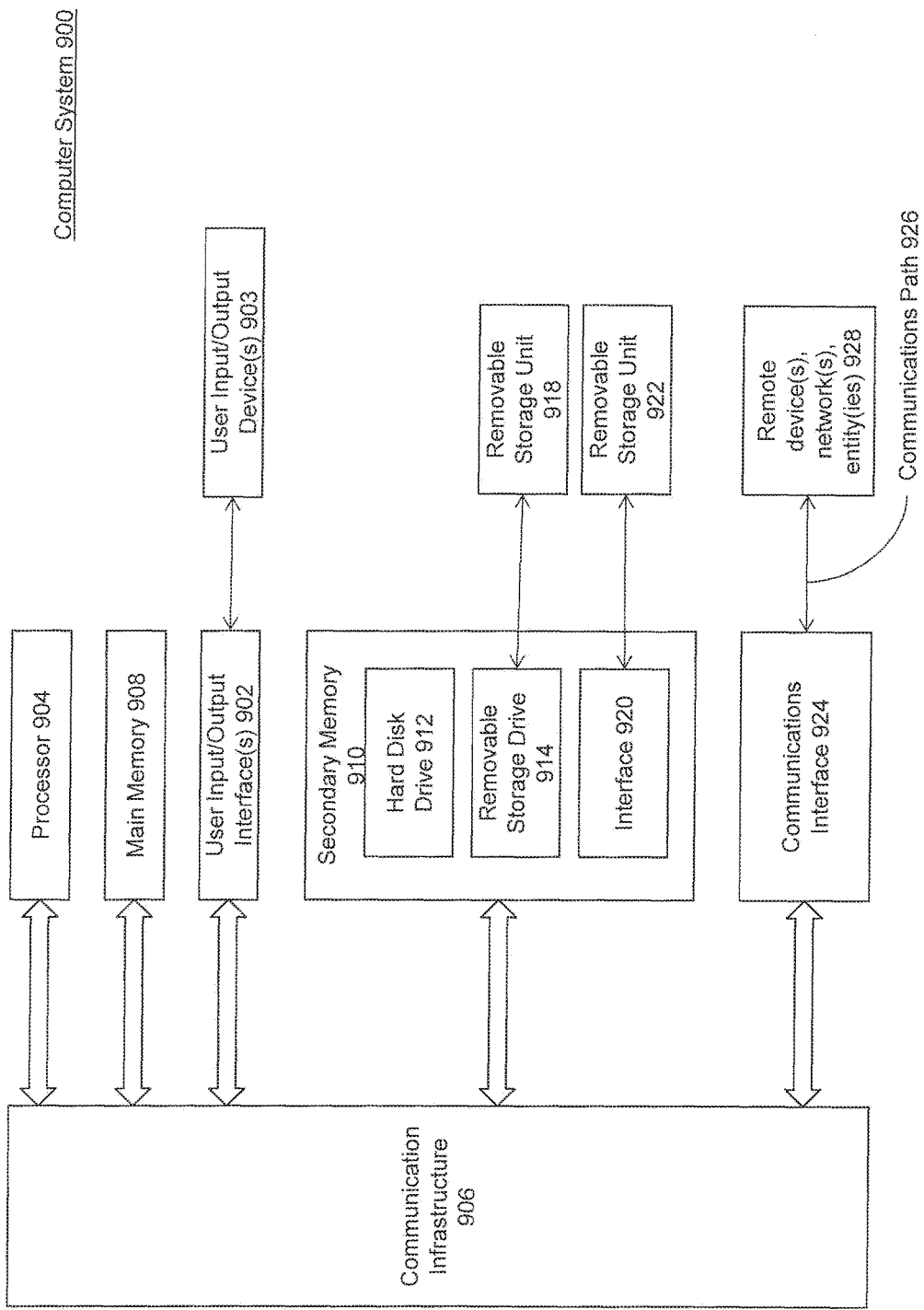
FIG. 9 is an example computer system useful for implementing various embodiments.

Various embodiments can be implemented, for example, using one or more computer systems, such as computer system 900 shown in FIG. 9. Computer system 900 can be used, for example, to implement method 600 of FIG. 6, method 700 of FIG. 7, and/or method 800 of FIG. 8. For example, computer system 900 can perform operations of root cause detection system 120 and/or any other components of system 100 as discussed with respect to FIGS. 1-8 in an automated manner, according to some embodiments. Computer system 900 can further be designed for data flow analysis process and/or path execution service, according to some embodiments. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communications path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method, comprising:
receiving, by at least one processor, a request to determine a root cause of an error associated with a code;
executing, by the at least one processor, a first execution path and a second execution path, where the first and second execution paths correspond to the code;
determining, by the at least one processor, that a difference between first data generated by the execution of the first execution path and second data generated by the execution of the second execution path affects the error associated with the code;
identifying, by the at least one processor and responsive to the determining, a code component that contributed to the difference between the first data and the second data;
determining, by the at least one processor, that the difference between the first data and the second data contributes to at least one of the error associated with the code or a second code component following the identified code component; and
storing, by the at least one processor, information associated with the identified code component for further analysis.

2. The method of claim 1, further comprising:
comparing, by the at least one processor, the first data generated by the execution of the first execution path to the second data generated by the execution of the second execution path.

3. The method of claim 1, further comprising:
receiving, by the at least one processor, information associated with the error and the code; and
executing, by the at least one processor, the code according to the received information.

4. The method of claim 1, further comprising:
determining, by the at least one processor, one or more code components associated with the code; and
determining, by the at least one processor, one or more versions for each of the one or more code components.

5. The method of claim 4, further comprising:
determining, by the at least one processor, the first execution path and the second execution path based on the one or more versions.

6. The method of claim 1, wherein the first execution path and the second execution path are executed substantially simultaneously.

7. The method of claim 1, further comprising:
analyzing, by the at least one processor, one or more versions of the identified code component that contributed to the difference between the first data and the second data.

8. The method of claim 1, further comprising:
determining, by the at least one processor, one or more code components associated with the code;
determining, by the at least one processor, one or more versions for each of the one or more code components;
planning, by the at least one processor, the first execution path and the second execution path based on the one or more versions of each of the one or more code components.

9. A system, comprising:
a memory; and
at least one processor coupled to the memory and configured to:
receive a request to determine a root cause of an error associated with a code;
execute a first execution path and a second execution path, where the first and second execution paths correspond to the code;
determine that a difference between first data generated by the execution of the first execution path and second data generated by the execution of the second execution path affects the error associated with the code;
identify, responsive to the determining, a code component that contributed to the difference between the first data and the second data;
determine that the difference between the first data and the second data contributes to at least one of the error associated with the code or a second code component following the identified code component; and
store information associated with the identified code component for further analysis.

10. The system of claim 9, wherein the at least one processor is further configured to:
compare the first data generated by the execution of the first execution path to the second data generated by the execution of the second execution path.

11. The system of claim 9, wherein the at least one processor is further configured to:
receive information associated with the error and the code; and
execute the code according to the received information.

12. The system of claim 9, wherein the at least one processor is further configured to:
determine one or more code components associated with the code; and
determine one or more versions for each of the one or more code components.

13. The system of claim 12, wherein the at least one processor is further configured to:
determine the first execution path and the second execution path based on the one or more versions.

14. The system of claim 9, wherein the first execution path and the second execution path are executed substantially simultaneously.

15. A non-transitory computer-readable device having instructions stored thereon that, when executed by at least one computing device, causes the at least one computing device to perform operations comprising:
receiving a request to determine a root cause of an error associated with a code;
executing a first execution path and a second execution path, where the first and second execution paths correspond to the code;
determining that a difference between first data generated by the execution of the first execution path and second data generated by the execution of the second execution path affects the error associated with the code;
identifying, responsive to the determining, a code component that contributed to the difference between the first data and the second data;
determining that the difference between the first data and the second data contributes to at least one of the error associated with the code or a second code component following the identified code component; and
storing information associated with the identified code component for further analysis.

16. The computer-readable device of claim 15, the operations further comprising:
comparing the first data generated by the execution of the first execution path to the second data generated by the execution of the second execution path.

17. The computer-readable device of claim 15, the operations further comprising:
receiving information associated with the error and the code; and
executing the code according to the received information.

18. The computer-readable device of claim 15, the operations further comprising:
determining one or more code components associated with the code; and
determining one or more versions for each of the one or more code components.

19. The computer-readable device of claim 18, the operations further comprising:
determining the first execution path and the second execution path based on the one or more versions.

20. The computer-readable device of claim 15, wherein the first execution path and the second execution path are executed substantially simultaneously.

* * * * *